(12) United States Patent
Chin-Chin

(10) Patent No.: US 6,892,618 B2
(45) Date of Patent: May 17, 2005

(54) CIRCULAR SAWING MACHINE HAVING A LINK MECHANISM

(76) Inventor: Chang Chin-Chin, No. 41, Nan-Tsun Rd., Hou-Li Hsiang, Taichung Hsien (TW)

( * ) Notice: Subject to any disclaimer, the term of this patent is extended or adjusted under 35 U.S.C. 154(b) by 0 days.

(21) Appl. No.: 10/635,190

(22) Filed: Aug. 6, 2003

(65) Prior Publication Data

US 2005/0028660 A1 Feb. 10, 2005

(51) Int. Cl.[7] .................................................. B27B 5/20
(52) U.S. Cl. ........................ 83/485; 83/471.2; 83/471.3; 16/334
(58) Field of Search ................................ 83/485, 471.3, 83/472, 477, 477.1, 487, 488, 489, 581, 486.1, 473, 490, 397, 471.2, 698.11; 144/744.5, 917; 700/1; 74/469, 471, 481, 486; 16/302, 346, 344, 335

(56) References Cited

U.S. PATENT DOCUMENTS

| | | | | |
|---|---|---|---|---|
| 1,190,215 A | * | 7/1916 | Becker | .......................... 74/521 |
| 1,765,733 A | * | 6/1930 | Olsen | .......................... 83/471.3 |
| 2,007,563 A | * | 7/1935 | De Koning | ................. 83/486.1 |
| 2,551,130 A | * | 5/1951 | Hunt et al. | ..................... 83/490 |
| 4,712,969 A | * | 12/1987 | Kimura | ....................... 414/730 |
| 4,765,098 A | * | 8/1988 | Duff et al. | ................... 451/236 |
| 5,257,570 A | * | 11/1993 | Shiotani et al. | ............. 83/471.3 |
| 5,288,379 A | * | 2/1994 | Namiki et al. | .......... 204/192.12 |
| 5,365,812 A | * | 11/1994 | Harnden | ......................... 83/34 |
| 5,743,704 A | * | 4/1998 | Caveney et al. | .......... 414/744.5 |
| 5,791,224 A | * | 8/1998 | Suzuki et al. | .................. 83/488 |
| 6,132,165 A | * | 10/2000 | Carducci | .................. 414/744.5 |
| 6,532,853 B1 | * | 3/2003 | Kakimoto et al. | ........ 83/698.11 |
| 6,575,691 B1 | * | 6/2003 | Saeki | ........................ 414/744.5 |
| 6,719,516 B2 | * | 4/2004 | Kroeker | ....................... 414/217 |
| 6,722,834 B1 | * | 4/2004 | Tepman | ....................... 414/217 |
| 2001/0006284 A1 | * | 7/2001 | Sebazco | ....................... 280/88 |

* cited by examiner

*Primary Examiner*—Allan N. Shoap
*Assistant Examiner*—Ghassem Alie

(57) ABSTRACT

A circular sawing machine includes a base, a saw seat movable relative to the base, and a link mechanism pivotally mounted between the base and the saw seat, so that the saw seat is linearly movable relative to the base. Thus, the link mechanism can absorb vibration or shock during operation of the circular saw blade so as to provide a shock-absorbing effect the circular saw blade, so that the circular saw blade can be operated smoothly and stably.

6 Claims, 5 Drawing Sheets

CIRCULAR SAWING MACHINE HAVING A LINK MECHANISM

BACKGROUND OF THE INVENTION

1. Field of the Invention

The present invention relates to a circular sawing machine, and more particularly to a circular sawing machine having a link mechanism.

2. Description of the Related Art

A conventional circular sawing machine in accordance with the prior art shown in FIG. 1 comprises a base 10 formed with a cutting slot 12 and having a side provided with a support seat 15, a movable shaft 16 slidably mounted on the support seat 15 of the base 10, a motor seat 14 secured on the movable shaft 16 to move therewith, and a saw seat 11 secured on the movable shaft 16 to move therewith. In addition, the saw seat 11 is provided with a circular saw blade 13 that can be extended into the cutting slot 12 of the base 10. Thus, when the movable shaft 16 is pushed or pulled to move forward and backward, the saw seat 11 is moved with the movable shaft 16, so that the circular saw blade 13 can be moved forward and backward in a linear manner so as to cut the workpiece horizontally.

However, the movable shaft 16 does not have a shock-absorbing effect, so that when the circular saw blade 13 is moved to cut the workpiece, vibration produced between the motor seat 14 and the movable shaft 16 is directly transmitted to the circular saw blade 13, thereby seriously affecting the cutting operation of the circular saw blade 13. In addition, the movable shaft 16 cannot be folded, thereby occupying a larger storage space when not in use.

SUMMARY OF THE INVENTION

The present invention is to mitigate and/or obviate the disadvantage of the conventional circular sawing machine.

The primary objective of the present invention is to provide a circular sawing machine having a link mechanism.

Another objective of the present invention is to provide a circular sawing machine, wherein the link mechanism can absorb vibration or shock during operation of the circular saw blade so as to provide a shock-absorbing effect the circular saw blade, so that the circular saw blade can be operated smoothly and stably.

A further objective of the present invention is to provide a circular sawing machine, wherein the link mechanism can be fully folded, so that the link mechanism will not occupy much space when not in use, thereby facilitating storage and operation of the circular sawing machine.

In accordance with the present invention, there is provided a circular sawing machine, comprising:

a base;

a saw seat movable relative to the base; and a link mechanism pivotally mounted between the base and the saw seat, so that the saw seat is linearly movable relative to the base.

Further benefits and advantages of the present invention will become apparent after a careful reading of the detailed description with appropriate reference to the accompanying drawings.

DETAILED DESCRIPTION OF THE INVENTION

Figure 1:
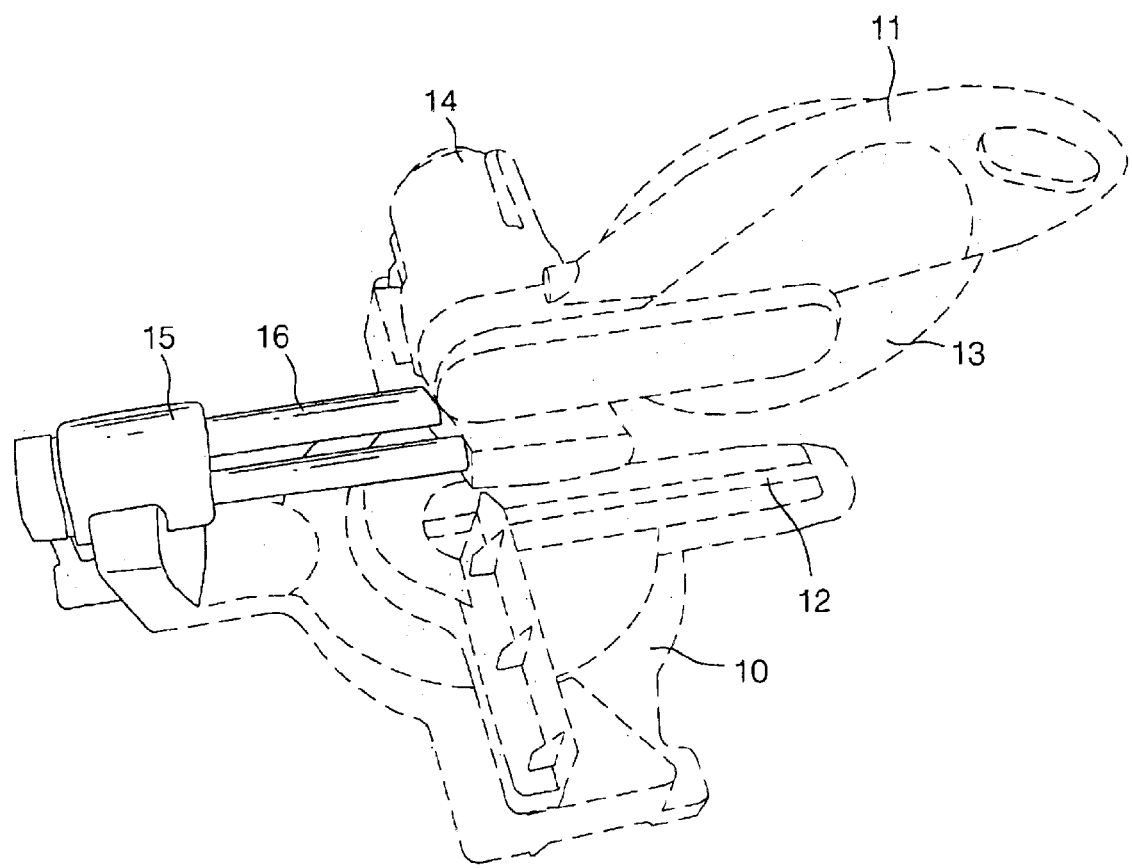
FIG. 1 is a perspective view of a conventional circular sawing machine in accordance with the prior art.
Figure 2:
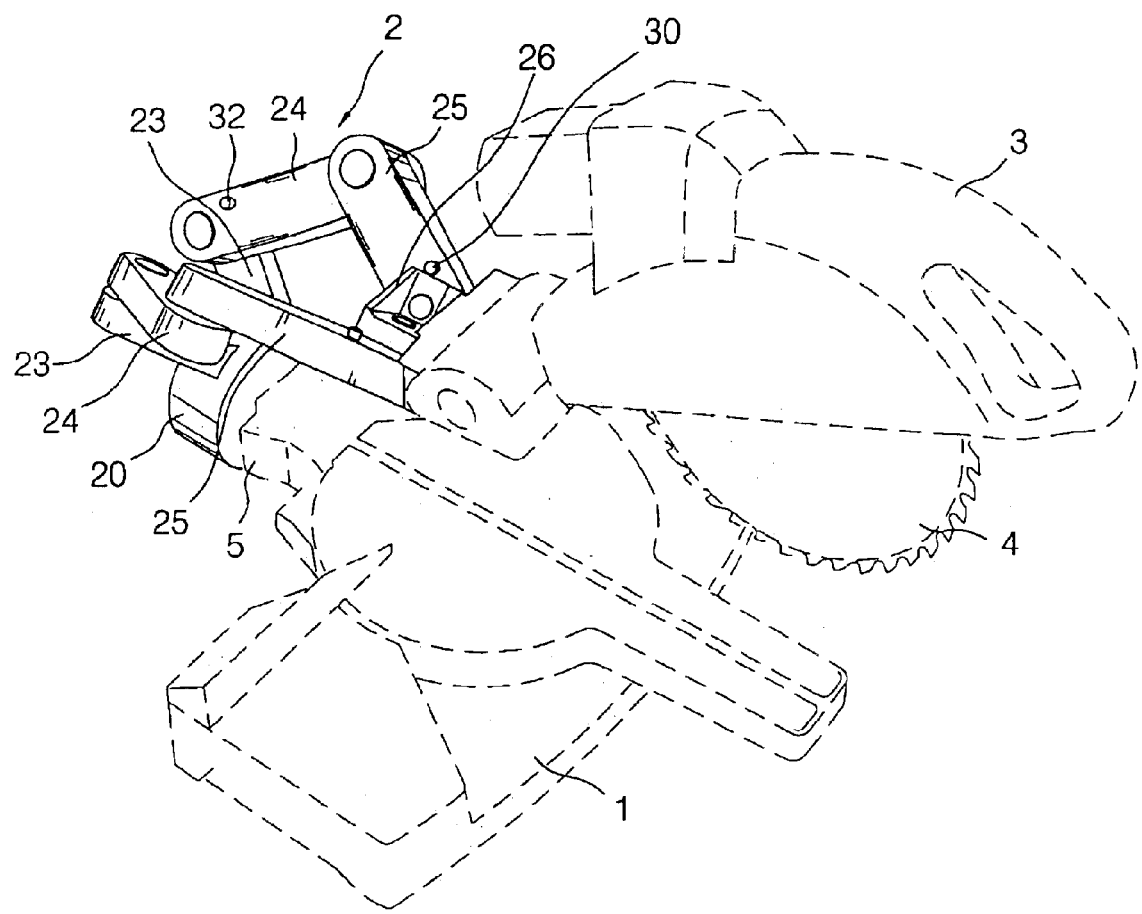
FIG. 2 is a perspective view of a circular sawing machine in accordance with the preferred embodiment of the present invention.

Referring to the drawings and initially to FIGS. 2–5, a circular sawing machine in accordance with the preferred embodiment of the present invention comprises a base 1, a saw seat 3 movable relative to the base 1, and a link mechanism 2 pivotally mounted between the base 1 and the saw seat 3, so that the saw seat 3 is linearly movable relative to the base 1.

The base 1 has a side provided with a support seat 5.

The saw seat 3 is provided with a circular saw blade 4.

The link mechanism 2 includes a positioning seat 20 secured on the support seat 5 of the base 1, two symmetrically opposite first links 23 each having a first end 230 mounted on the positioning seat 20, two symmetrically opposite second links 24 each having a first end 240 pivotally mounted on a second end 232 of a respective one of the two first links 23, and two symmetrically opposite third links 25 each having a first end 250 pivotally mounted on a second end 242 of a respective one of the two second links 24 and a second end 252 pivotally mounted on a connecting seat 26 which is mounted on the saw seat 3. Preferably, the positioning seat 20 of the link mechanism 2 is secured on the support seat 5 of the base 1 by a locking pin 21.

Figure 3:
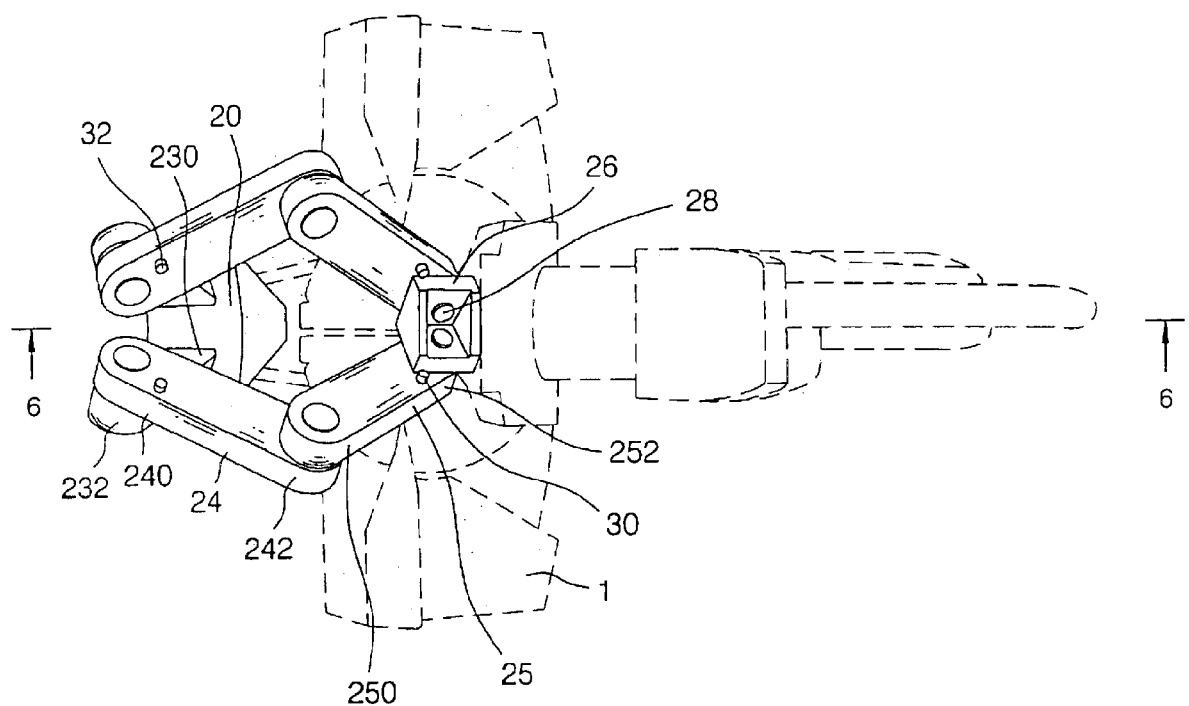
FIG. 3 is a top plan view of the circular sawing machine as shown in FIG. 2.

Thus, the link mechanism 2 mounted between the base 1 and the saw seat 3 has a symmetrical structure, so that the saw seat 3 and the circular saw blade 4 can be moved linearly relative to the base 1 by linear movement of the link mechanism 2 as shown in FIG. 3.

Figure 5:
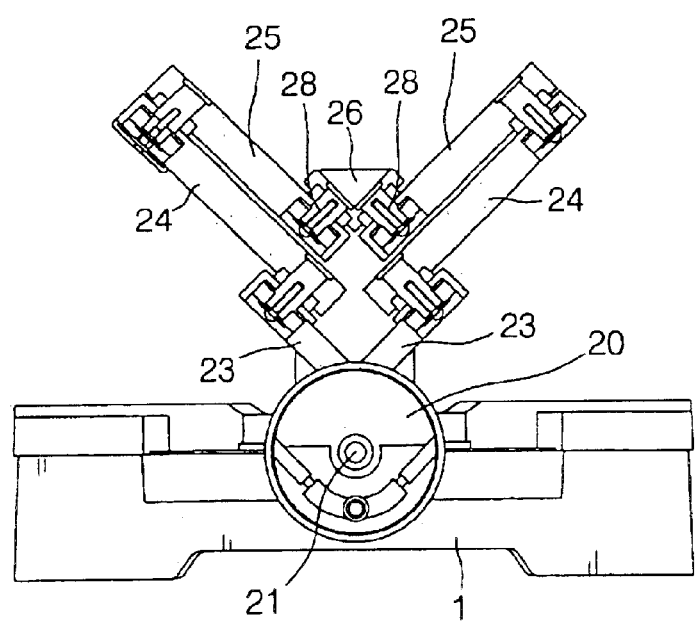
FIG. 5 is a side plan view of the circular sawing machine as shown in FIG. 2.

As shown in FIG. 5, the two first links 23 are arranged in a substantially V-shaped manner, the two second links 24 are arranged in a substantially V-shaped manner, and the two third links 25 are also arranged in a substantially V-shaped manner. In addition, the connecting seat 26 is substantially V-shaped and has two sides each pivotally connected with the second end 252 of the respective third link 25 by a pivot shaft 28.

Figure 6:
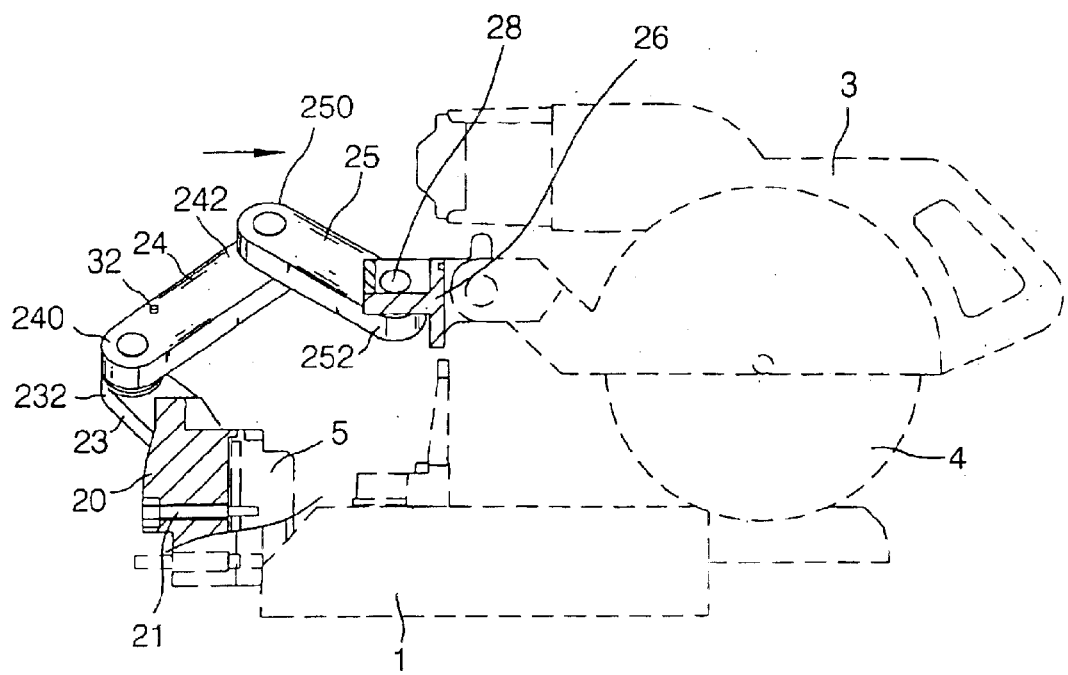
FIG. 6 is a plan cross-sectional view of the circular sawing machine taken along line 6—6 as shown in FIG. 3.

As shown in FIGS. 3 and 6, the second end 252 of each of the two third links 25 is provided with a catch block 30 that can be rested on the connecting seat 26 when each of the two third links 25 is extended outward relative to the respective second link 24 to the outermost position as shown in FIG. 3, so as to limit the outermost stroke of each of the two third links 25.

Figure 7:
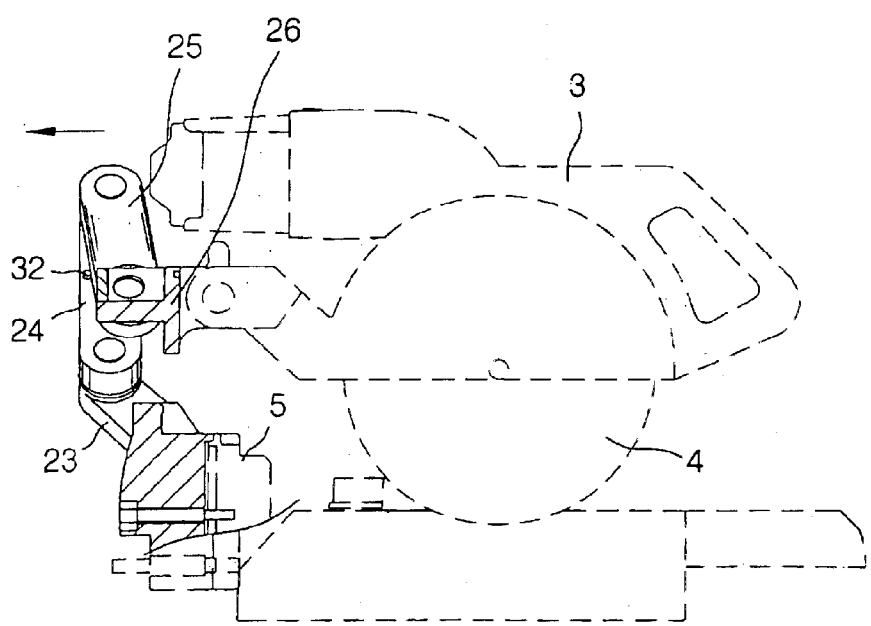
FIG. 7 is a schematic operational view of the circular sawing machine as shown in FIG. 6.

As shown in FIG. 7, the first end 240 of each of the two second links 24 is provided with a catch block 32 that can be rested on the respective third link 25 when each of the two third links 25 is retracted inward relative to the respective second link 24 to the innermost position as shown in FIG. 7, so as to limit the innermost stroke of each of the two third links 25.

Thus, the link mechanism 2 can be fully extended outward to the outermost position as shown in FIG. 6, and can be fully retracted inward to the innermost position as shown in FIG. 7, so that the saw seat 3 and the circular saw blade 4 can be moved forward and backward in a linear manner by linear movement of the link mechanism 2 so as to cut the workpiece horizontally.

Figure 4:
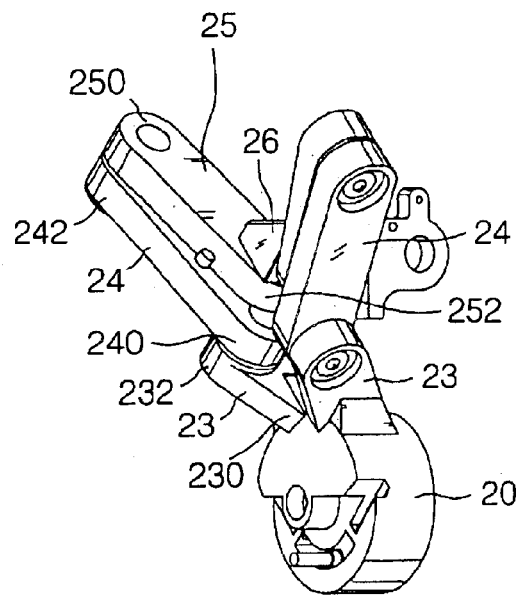
FIG. 4 is a perspective view of a link mechanism of the circular sawing machine in accordance with the preferred embodiment of the present invention.

Accordingly, the link mechanism 2 can absorb vibration or shock during operation of the circular saw blade 4 so as to provide a shock-absorbing effect the circular saw blade 4, so that the circular saw blade 4 can be operated smoothly and stably. In addition, the link mechanism 2 can be fully folded as shown in FIG. 4, so that the link mechanism 2 will not occupy much space when not in use, thereby facilitating storage and operation of the circular sawing machine.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A circular sawing machine, comprising:
   a base;
   a saw seat movable relative to the base; and
   a link mechanism pivotally mounted between the base and the saw seat, so that the saw seat is linearly movable relative to the base, the link mechanism has a symmetrical structure so that the saw seat can be moved linearly relative to the base by linear movement of the link mechanism, the link mechanism including a positioning seat secured on the base, two symmetrically opposite first links each having a first end mounted on the positioning seat, two symmetrically opposite second links each having a first end pivotally mounted on a second end of a respective one of the two first links, and two symmetrically opposite third links each having a first end pivotally mounted on a second end of a respective one of the two second links and a second end pivotally mounted on a connecting seat which is mounted on the saw seat, wherein:
   the two first links are arranged in a substantially V-shaped manner;
   the two second links are arranged in a substantially V-shaped manner;
   the two third links are arranged in a substantially V-shaped manner; and
   the connecting seat is substantially V-shaped.

2. The circular sawing machine in accordance with claim 1, wherein the base has a side provided with a support seat, and the positioning seat of the link mechanism is secured on the support seat of the base by a locking pin.

3. The circular sawing machine in accordance with claim 1, wherein the connecting seat has two sides each pivotally connected with the second end of the respective third link by a pivot shaft.

4. The circular sawing machine in accordance with claim 1, wherein the second end of each of the two third links is provided with a catch block that can be rested on the connecting seat when each of the two third links is extended outward relative to the respective second link to the outermost position, so as to limit the outermost stroke of each of the two third links.

5. The circular sawing machine is accordance with claim 1, wherein the first end of each of the two second links is provided with a catch block that can be rested on the respective third link when each of the two third links is retracted inward relative to the respective second link to the innermost position, so as to limit the innermost stroke of each of the two third links.

6. The circular sawing machine in accordance with claim 1, wherein the saw seat is provided with a circular saw blade.

* * * * *